United States Patent [19]

Lobanoff

[11] E Patent Number: Re. 33,423

[45] Reissued Date of Patent: Nov. 6, 1990

[54] VANITY MIRROR OR VEHICLE ACCESSORY ASSEMBLY AND MOUNTING APPARATUS THEREFOR

[75] Inventor: Mark Lobanoff, Troy, Mich.

[73] Assignee: Irvin Automotive Products, Inc., Auburn Hills, Mich.

[21] Appl. No.: 290,706

[22] Filed: Dec. 27, 1988

Related U.S. Patent Documents

Reissue of:

[64] Patent No.: 4,681,366
Issued: Jul. 21, 1987
Appl. No.: 795,520
Filed: Nov. 6, 1985

U.S. Applications:

[63] Continuation-in-part of Ser. No. 746,676, Jun. 20, 1985, abandoned, which is a continuation-in-part of Ser. No. 627,280, Jul. 2, 1984, abandoned.

[51] Int. Cl.[5] ..... A47C 7/62

[52] U.S. Cl. ..... 297/191; 248/475.1; 297/135; 297/410

[58] Field of Search ..... 297/185, 191, 217, 188, 297/254, 410; 248/118, 466, 475.1

[56] References Cited

U.S. PATENT DOCUMENTS

| | | | |
|---|---|---|---|
| 325,006 | 8/1885 | Neeley . | |
| 876,039 | 1/1908 | Burrell . | |
| 1,026,706 | 5/1912 | Sears . | |
| 1,555,658 | 9/1925 | Gongaware . | |
| 1,573,272 | 2/1926 | Phillips . | |
| 1,806,059 | 5/1931 | Hoople . | |
| 1,893,458 | 1/1933 | Tatum | 297/191 |
| 1,958,934 | 5/1934 | Williams . | |
| 2,020,585 | 11/1935 | Stansberry . | |
| 2,097,419 | 10/1937 | Schmidt . | |
| 2,123,319 | 7/1938 | Thompson . | |
| 2,134,414 | 10/1938 | Norcross . | |
| 2,148,557 | 2/1938 | Hook . | |
| 2,231,641 | 2/1941 | Schwab . | |
| 2,262,875 | 11/1941 | Almer . | |
| 2,268,189 | 12/1941 | Colbert . | |
| 2,432,674 | 12/1947 | Office . | |
| 2,466,454 | 4/1949 | Logan . | |
| 2,486,096 | 10/1949 | Axford et al. . | |
| 2,506,689 | 5/1950 | Simpson et al. . | |
| 2,547,101 | 4/1951 | Uttz . | |
| 2,603,530 | 7/1952 | Jones . | |
| 2,640,909 | 6/1953 | Montgomery . | |
| 2,673,670 | 3/1954 | Steele . | |
| 2,711,213 | 6/1955 | Owens | 297/188 X |
| 2,733,763 | 2/1956 | Nygaard . | |
| 2,844,200 | 7/1958 | Herr et al. . | |
| 2,918,570 | 12/1959 | Diedring . | |
| 3,019,050 | 1/1962 | Spielman | 297/191 X |
| 3,140,781 | 7/1964 | Rothgart . | |
| 3,208,792 | 2/1965 | Martin . | |
| 3,211,903 | 10/1965 | McElreath . | |
| 3,305,679 | 2/1967 | Barcita-Peruchena . | |
| 3,375,364 | 3/1968 | Marcus . | |
| 3,407,683 | 10/1968 | Liedel | 248/481 X |
| 3,410,602 | 11/1968 | Schuler . | |
| 3,449,011 | 6/1969 | Edwards et al. | 297/410 X |
| 3,542,416 | 11/1970 | Nelson . | |
| 3,576,409 | 4/1971 | Fiddler . | |
| 3,588,233 | 6/1971 | Lambert | 248/475.1 X |

(List continued on next page.)

*Primary Examiner*—Peter R. Brown
*Attorney, Agent, or Firm*—Harness, Dickey & Pierce

[57] ABSTRACT

A vehicle seat assembly is disclosed, comprising a vehicle seat; a mirror disposed on the rear side of the seat; and preferably a cover for the mirror with a means for mounting the cover to the assembly. A second embodiment is disclosed wherein a light is disposed on the rear side of the seat. Preferably, the mirror or light are covered when the cover is in a closed position. A third embodiment is disclosed wherein the mirror is movable. Preferably the mirror, or mirror and light, assembly is mounted to an apparatus provided for supportingly interconnecting a head restraint with the vehicle seat, either in a fixed position or in a vertically movable arrangement.

59 Claims, 6 Drawing Sheets

U.S. PATENT DOCUMENTS

| | | | |
|---|---|---|---|
| 3,610,680 | 10/1971 | Brady . | |
| 3,615,118 | 10/1971 | Buxton | 297/191 |
| 3,622,231 | 11/1971 | Hansen . | |
| 3,641,334 | 2/1972 | Kipping . | |
| 3,692,992 | 9/1972 | Bain et al. . | |
| 3,751,106 | 8/1973 | Mahler et al. . | |
| 3,794,828 | 2/1974 | Arpino . | |
| 3,795,422 | 2/1974 | Robinson et al. | 297/191 |
| 3,828,994 | 8/1974 | Hollins | 297/254 X |
| 3,853,370 | 12/1974 | Barnhart . | |
| 3,871,703 | 3/1974 | Accatino . | |
| 3,872,295 | 3/1975 | Clancy . | |
| 3,926,470 | 12/1975 | Marcus . | |
| 3,976,275 | 8/1976 | Clark . | |
| 4,000,404 | 12/1976 | Marcus . | |
| 4,058,340 | 11/1977 | Pinkas . | |
| 4,075,468 | 2/1978 | Marcus . | |
| 4,103,860 | 8/1978 | Haas et al. . | |
| 4,146,762 | 3/1979 | Peck et al. . | |
| 4,174,864 | 11/1979 | Viertel et al. . | |
| 4,202,030 | 5/1980 | Kimura . | |
| 4,323,275 | 4/1982 | Lutz . | |
| 4,363,511 | 12/1982 | Viertel et al. . | |
| 4,363,512 | 12/1982 | Marcus . | |
| 4,421,355 | 12/1983 | Marcus . | |
| 4,521,051 | 6/1985 | Cody et al. . | |

FOREIGN PATENT DOCUMENTS

| | | |
|---|---|---|
| 1032112 | 6/1958 | Fed. Rep. of Germany . |
| 2027386 | 12/1971 | Fed. Rep. of Germany . |
| 0053663 | 7/1981 | Fed. Rep. of Germany . |
| 1143365 | 9/1957 | France . |
| 817159 | 7/1959 | United Kingdom . |
| 854938 | 11/1960 | United Kingdom . |
| 999331 | 7/1965 | United Kingdom . |
| 1043087 | 9/1966 | United Kingdom . |
| 1214327 | 12/1970 | United Kingdom . |

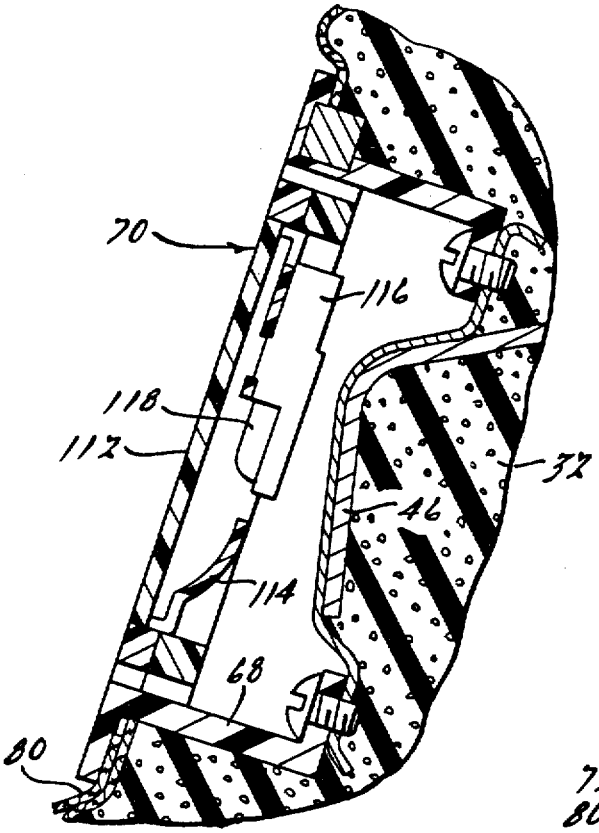
FIG. 8.
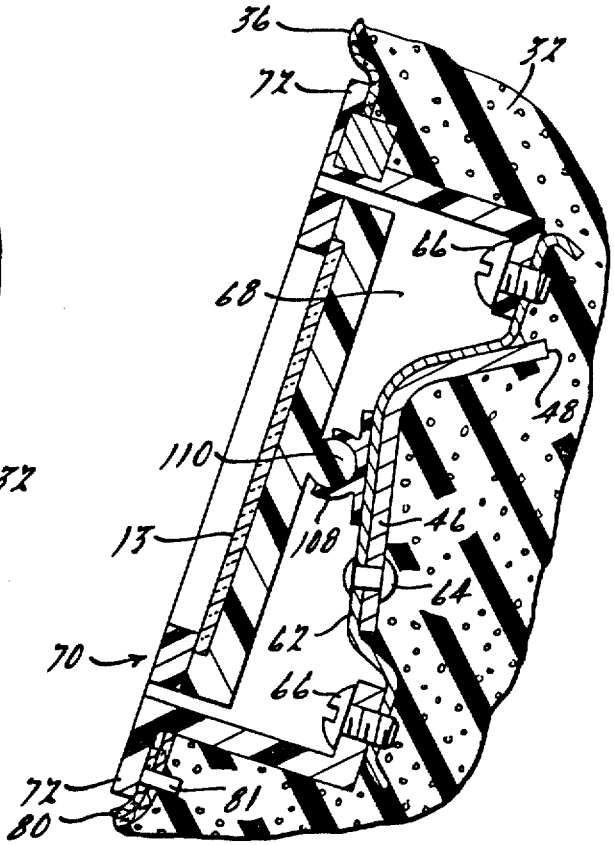
FIG. 7.
FIG. 9.
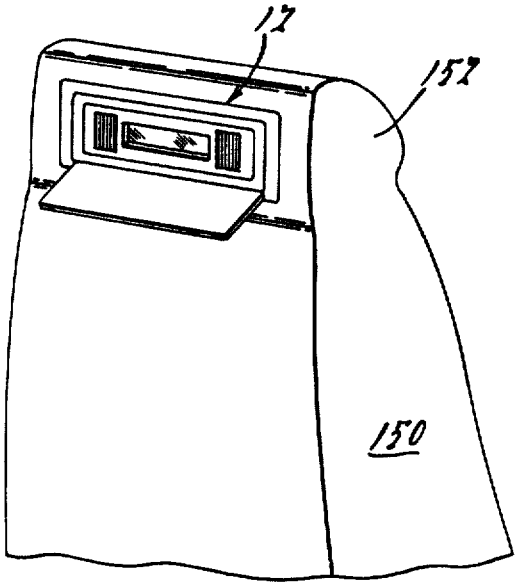
FIG. 10.
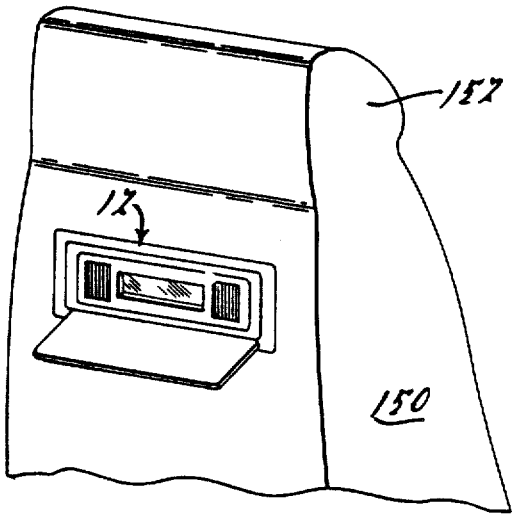

FIG. 13.
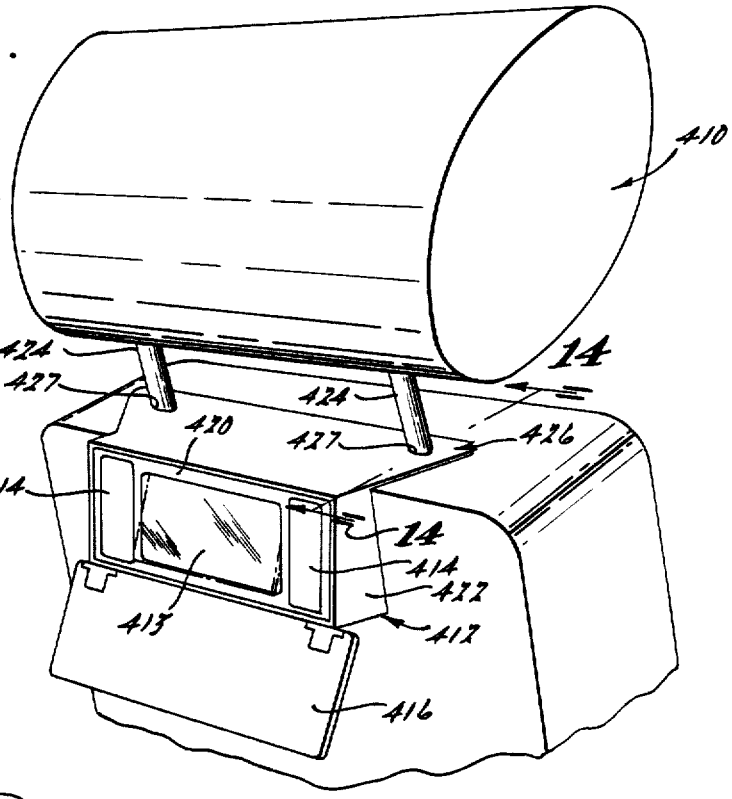
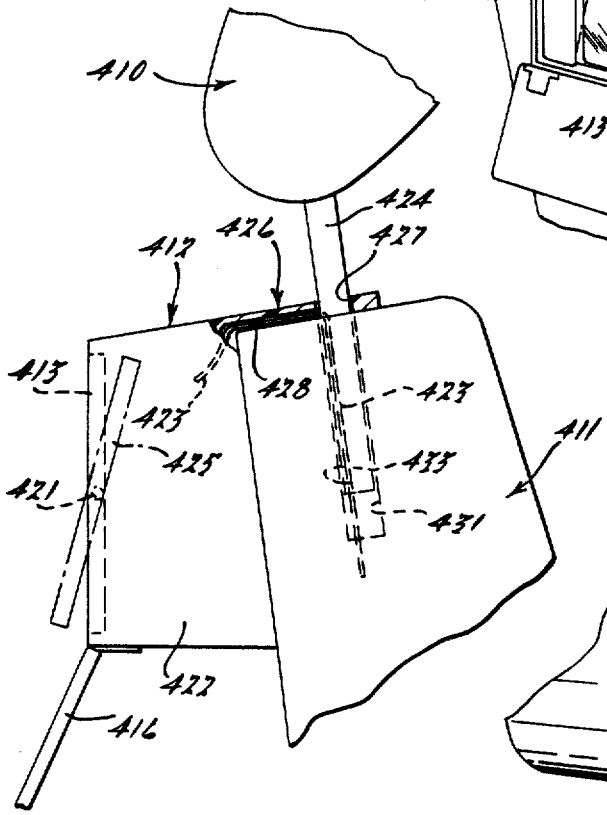
FIG. 14.
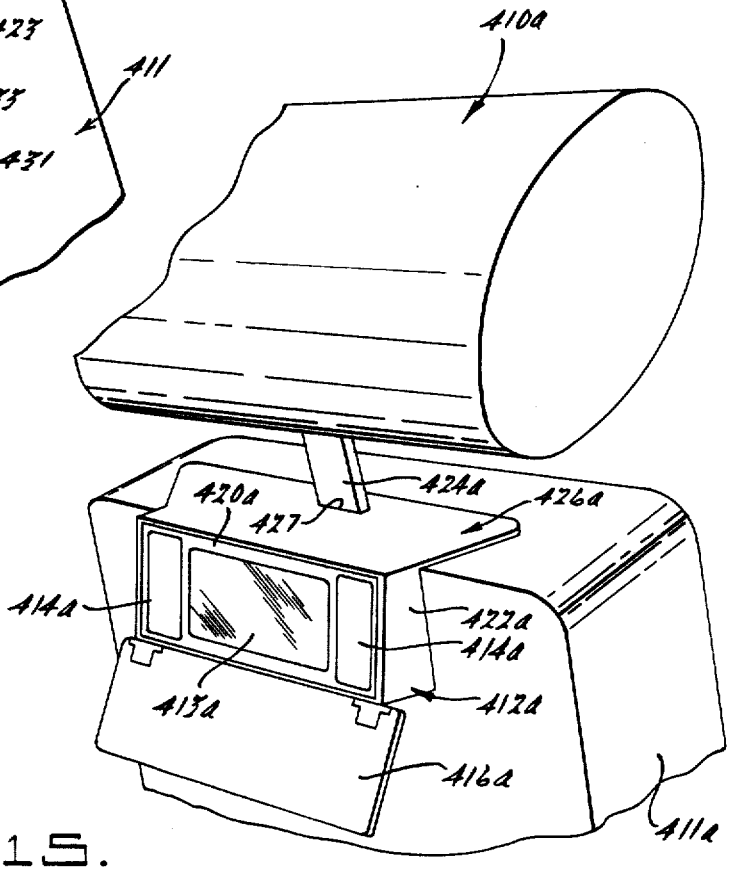
FIG. 15.

FIG. 16.
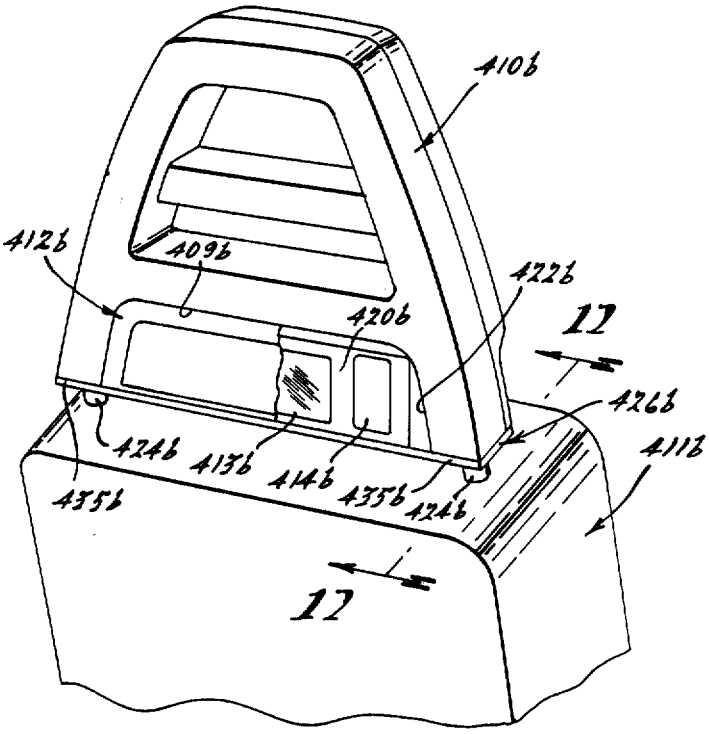
FIG. 18.
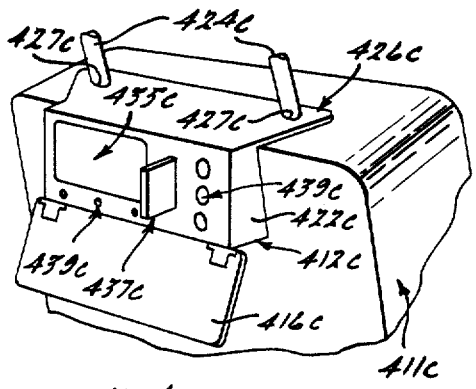
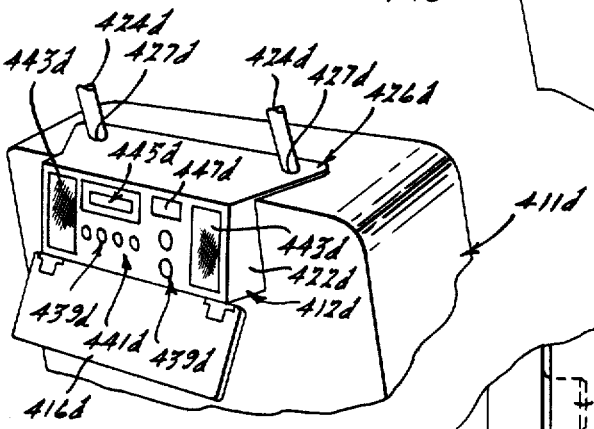
FIG. 19.
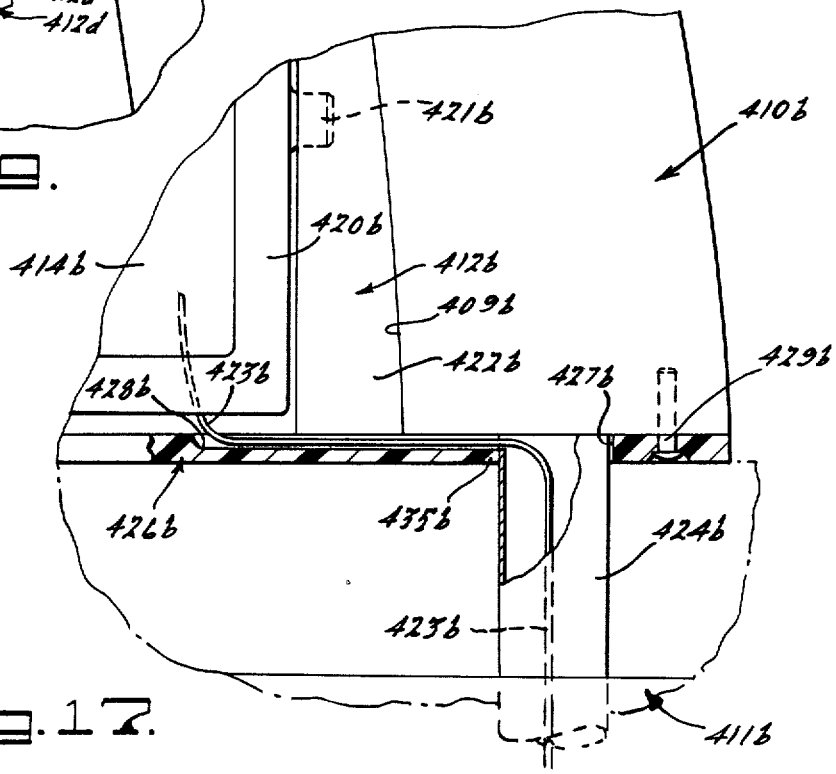
FIG. 17.

VANITY MIRROR OR VEHICLE ACCESSORY ASSEMBLY AND MOUNTING APPARATUS THEREFOR

Matter enclosed in heavy brackets [ ] appears in the original patent but forms no part of this reissue specification; matter printed in italics indicates the additions made by reissue.

CROSS REFERENCE TO RELATED APPLICATIONS

This is a continuation-in-part of a copending application for U.S. Ser. No. 746,676, filed June 20, 1985, which is a continuation-in-part of an application for U.S. Letters Patent, Ser. No. 627,280, filed July 2, 1984, and both of said applications are expressly incorporated herein by reference, now abandoned.

BACKGROUND AND BRIEF DESCRIPTION OF THE INVENTION

The present invention relates generally to mirror assemblies, mirror and light assemblies, and various other accessory assemblies, and more particularly to apparatus for mounting such assemblies on a seat assembly for a vehicle or other such device.

Automotive vehicle sunvisors having lighted vanity mirrors for forward seat passengers are known in the art. Such mirrors are normally located on the side of the visor facing the passenger when in lowered position and may be adjusted to the desired reflecting angle through adjustment of the visor, the angle of the mirror relative to the visor being fixed. These mirrors, as well as various lights and other vehicle accessories are frequently provided for the comfort and convenience of forward seat passengers.

In general, no similar vanity mirrors or other such accessories have been available for the convenience of rear seat passengers. Also, the only lights generally available for rear seat passengers for reading or the like while the vehicle is underway have been located in the header of the roof, or in some cases in side pillars of the vehicle. Such lights, if shining while the vehicle is underway, can be distracting to the driver and can possibly impair his clear vision of outside traffic conditions, particularly at night.

Accordingly, it is the primary object of the present invention to provide a vanity mirror and map or reading light arrangement which overcomes the aforementioned disadvantages of prior arrangements. The invention resides in the provision of a mirror assembly, or a miror and light or other accessory assembly, which is mounted so as to be disposed generally on the rear side of one or both of the front vehicle seat assemblies, either on the seat portion or on the head restraint portion thereof.

Another object of the present invention is to provide a multi-position vanity mirror, a multi-position vanity mirror and map or reading light, or other accessory arrangements for back seat passengers, as well as one which may be covered if desired.

Another object of the present invention resides in the provision of a neat, attractive head restraint for front seats which incorporates a vanity mirror, a vanity mirror and map or reading light, or other vehicle accessory arrangement for back seat passengers.

Another object of the present invention is to provide such a vanity mirror, a vanity mirror and light, or other accessory arrangement with a mounting apparatus that is relatively simple and inexpensive to manufacture and install either as standard or optional equipment on the vehicle, and that can be relatively easily removed and replaced if repairs or servicing is needed.

Front seat head restraints, or head rests, whether integrated or separate from the seat, have now become safety mandated standard equipment in order to protect passengers against neck injuries resulting from sudden vehicle acceleration caused by rear end collisions. Such head restraints are normally in close alignment with the forward vision of rear seat passengers. This has been discovered to provide an excellent location for a vanity mirror or other vehicle accessories for use by a rear seat passenger, except that most head restraints, unlike sunvisors, have a relatively fixed position so as not to easily accommodate adjustment of mirror angle. However, conventional head restraints do have a substantial depth, relatively greater than the thickness of a sunvisor, and this has been found to be sufficient to accommodate a pivotal mounting for the mirror within the headrest.

Typically, many vehicle seat assemblies having such head restraints include one or more head restraint mounting members or apparatuses that interconnect and support the head restraints relative to the seat, either in a fixed, or in a generally vertically adjustable, relationship therewith. Whether such head restraint mounting apparatuses support the head restraints in positions spaced apart from the seats, or in contact or engagement with the seats, they have been discovered to provide a suitable and convenient structure to which a mirror assembly, a mirror and light assembly, or other vehicle accessory assembly can be anchored and retained, usually with little or no modification to the seat assembly. Thus, the present invention provides for mounting apparatus for connecting such assemblies to such head restraint mounting apparatus in order to support the assemblies generally either on the rear side of the seat, or on the rear side of the head restraint. Among other advantages, such an arrangement allows a vehicle manufacturer to offer such assemblies as either standard equipment or as optional equipment on a particular vehicle, usually without the necessity of manufacturing and providing different seat or head restraint components of the seat assembly.

Furthermore, the provision of side lights on the mirror combined with a suitable pivoting action has also been found to provide a convenient supplemental reading or map light for the rear passengers which, in fact, may take the place of and obviate the necessity for a conventional overhead header or pillar light, with its attendant disadvantages.

Additional objects and advantages of the present invention will become apparent from a reading of the detailed description of the preferred embodiments, which make reference to the following set of drawings.

BRIEF DESCRIPTION OF THE DRAWINGS

FIG. 7 is an enlarged fragmentary cross-sectional view similar to FIG. 4, but illustrating a fifth embodiment of the invention.

FIG. 8 is a fragmentary cross-sectional view similar to FIG. 7, but illustrating the details of construction of a light assembly of the present invention.

FIGS. 9 through 12 are partial perspective views of four additional embodiments of the present invention.

FIG. 13 is a partial perspective view of the rear side of a head restraint and vehicle seat incorporating an exemplary embodiment of a vanity mirror and light assembly and associated mounting apparatus according to the present invention.

FIG. 14 is a partial cross-sectional view taken generally along lines 14—14 of FIG. 13.

FIG. 15 is a partial perspective view, similar to that of FIG. 13, but illustrating another embodiment of the present invention.

FIG. 16 is another partial perspective view, similar to that of FIG. 13, but illustrating still another embodiment of the present invention.

FIG. 17 is a partial cross-sectional view taken generally along lines 17—17 of FIG. 16.

FIGS. 18 and 19 are partial perspective views of two additional exemplary embodiments employing the principles of the present invention for mounting other vehicle accessories on a vehicle seat assembly.

DETAILED DESCRIPTION OF THE PREFERRED EMBODIMENTS

Figure 1:
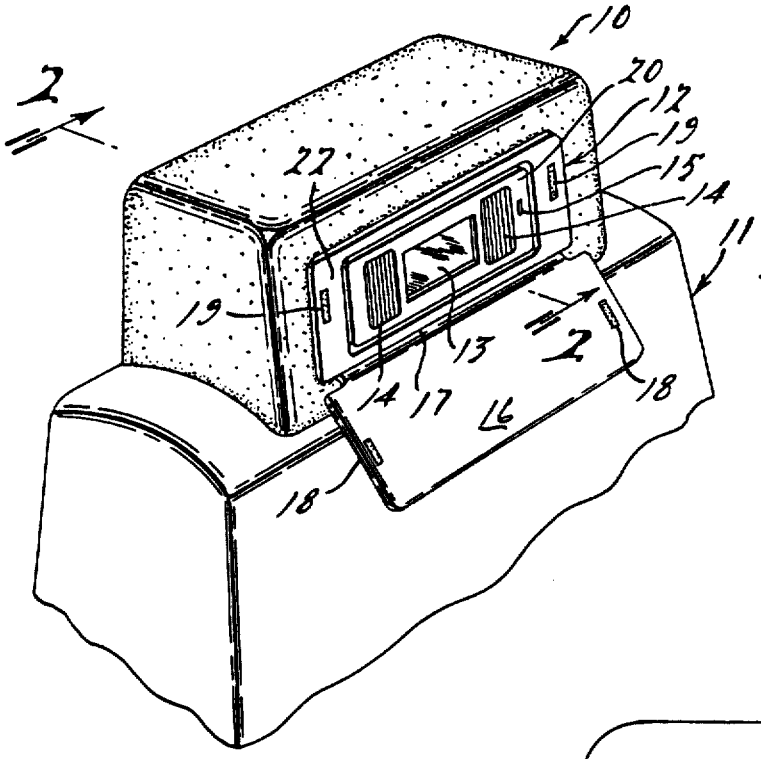
FIG. 1 is a partial perspective view of the rear side of a head restraint on the top of a vehicle front seat incorporating an embodiment of the vanity mirror assembly of the present invention.
Figure 3:
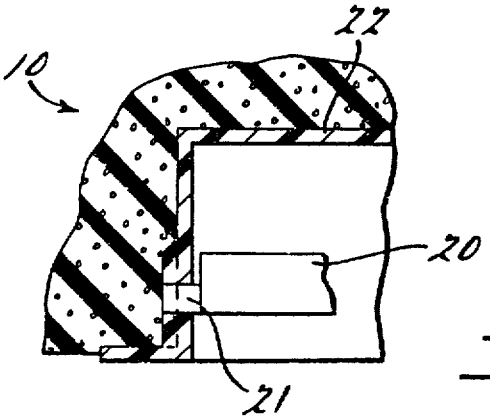
FIG. 3 is a partial cross-sectional view taken generally along line 3—3 of FIG. 2.

With reference to FIG. 1, there is illustrated a head restraint 10 mounted on the top of a vehicle front seat 11 and incorporating a lighted vanity mirror assembly 12 comprising an open plastic receptacle 22, in which is disposed a mirror housing 20 supporting a mirror 13, side lights 14, a light switch 15, and a cover 16 having a fabric hinge 17 and hook-and-loop strips 18. Mating hook-and-loop elements 19 disposed on receptacle 22 retain cover 16 in its closed position. As best shown in FIG. 3, housing 20 is provided with pivotal extensions 21 at each end pivotally disposed in suitable sockets in the ends of receptacle 22, which is embedded within the head restraint. Suitable wiring 23 extends along the headrest mounting arm 24 for lights 14 operated by switch 15, which may be of either the manually actuated slide type, or of the pushbutton type responsive to cover opening and closing control. It should be noted that in the various embodiments of the invention illustrated herein, the head restraint can be either fixed with respect to the seat, or selectively movable relative to the seat in order to selectively adjust or alter its vertical position relative to the seat.

Figure 2:
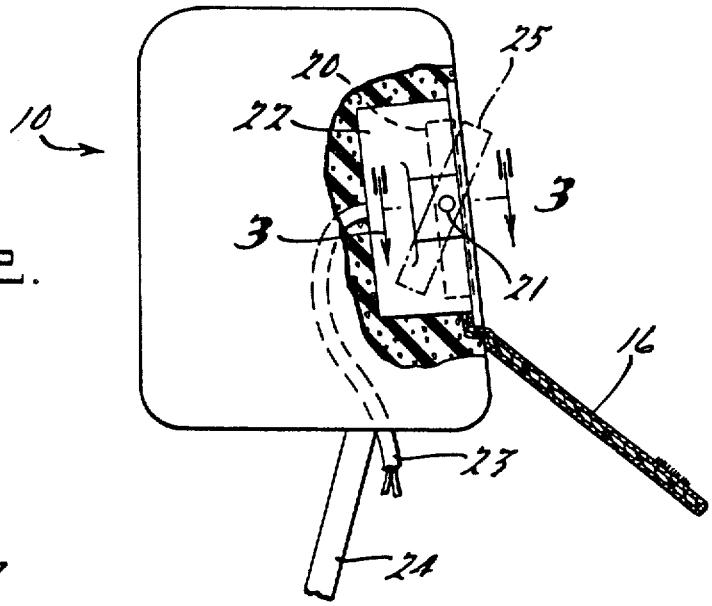
FIG. 2 is a partial cross-sectional view taken generally along line 2—2 of FIG. 1, but with the head restraint in a raised position with respect to the seat.

It will be understood that tilting of the mirror about a horizontal axis to any desired mirror reflecting, or map reading, angle as illustrated for example at 25 in FIG. 2, may be accommodated by the pivotal mounting at 21.

Figure 4:
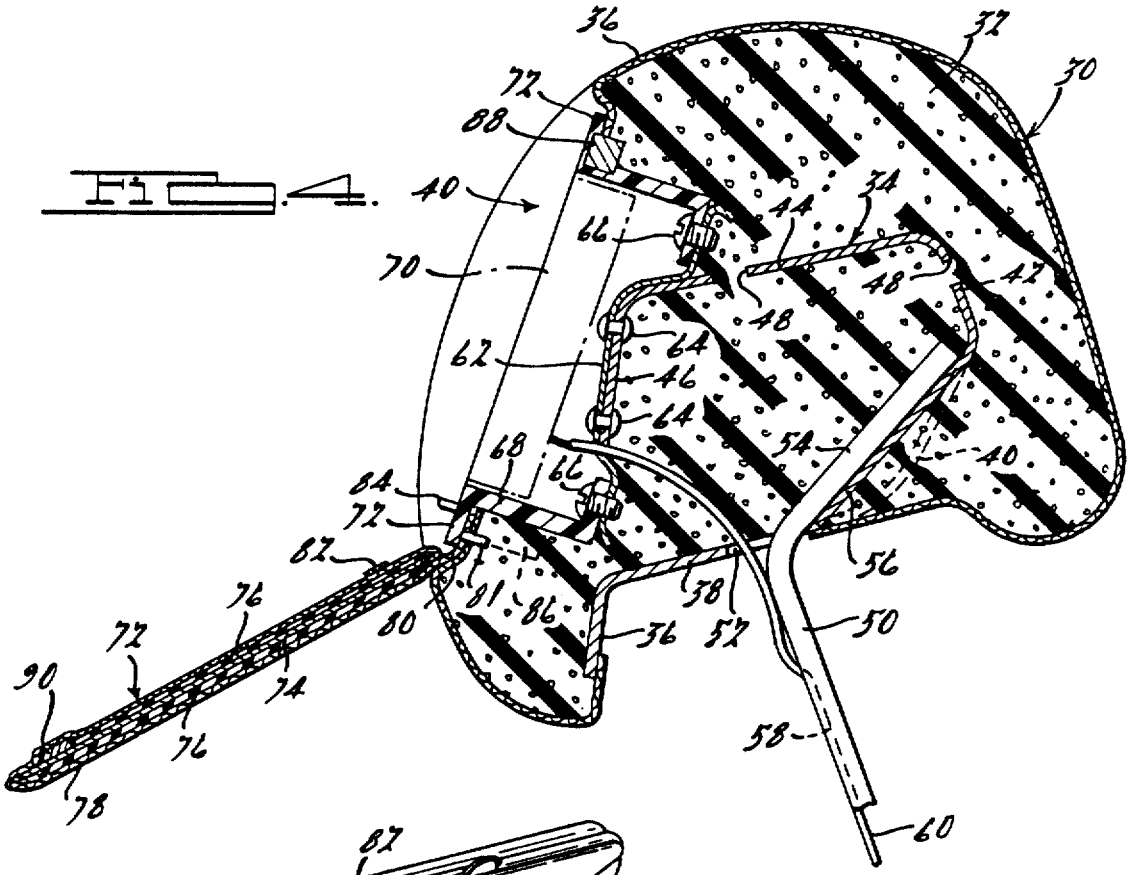
FIG. 4 is a partial transverse cross-sectional view of a second embodiment of the present invention.

Referring to FIG. 4, there is illustrated in transverse cross-section a head restraint 30 comprising a foam core 32, a reinforcing element 34 embedded therein, an outer skin 36 and a mirror assembly 40. The core, reinforcing element, and skin are conventional. Reinforcement element 34 is typically manufactured from sheet metal and possesses the properties and characteristics required by the automobile industry for sustaining shocks of acceleration and deceleration. It is of an overall tubular configuration, as shown in FIG. 4, comprising a flange 36, a bottom wall portion 38, rear wall portions 40 and 42, a top wall portion 44 substantially parallel to bottom wall portion 38, and a front wall portion 46. Reinforcement element 34 typically has a plurality of apertures 48 extending therethrough so that it will be permeated with foam and will be of minimum weight for its desired strength.

Head restraint 30 is typically mounted to the vehicle seat by one or more mounting arms 50 (generally similar to arms 24 in FIG. 1) extending through corresponding apertures 52 in bottom wall portion 38. Mounting arms 50 typically have an angled upper portions 54 affixed to mounting tabs 56 lanced out of wall portion 40. Mounting arms 50, which can be either rectangular or cylindrical cross-section, have one or more grooves 58 in which are disposed power leads 60. Furthermore, mounting arms 50, like any of the other mounting arms shown and discussed herein, can optionally be movable relative to the seat in order to allow selective adjustment of the vertical position of the head restraint 30 relative to seat 11.

Mirror assembly 40 comprises a mounting plate 62 having a shape complimentary to reinforcement element 34 and is affixed thereto by rivets or the like 64. Plate 62 supports, as by threaded fasteners 66, a rectangular open receptacle 68 (preferably composed of a plastic material), in which is pivotally disposed a mirror housing 70 (shown in phantom lines), which is identical to mirror housing 20 in the first embodiment. Receptacle 68 has a peripheral flange 72 which is generally flush with the surface of the head restraint and frames mirror housing 70. Mirror assembly 40 also includes a cover 72 having an overall rectangular shape in plan and comprising a relatively stiff elongated planar member 74 covered by a foam cushion 76 and an outer covering 78. Covering 78 includes an integral hinge portion 80 by which the cover is secured to head restraint 30, as by means of prongs 81 projecting inwardly from the inside face of the lower portion of flange 72. A pad 82 is positioned on cover 72 for contacting plunger 84 of a suitable light switch 86 affixed to the bottom of receptacle 68 and flange 72. Pad 82 may be a hard plastic circular disk and is positioned so that it actuates plunger 84 when the cover is pivoted upwardly to its closed position.

In order to secure cover 72 in its closed position one or more magnets 88 are affixed to the inside face of the top portion of flange 72, and a metallic strip 90 is positioned in cover 72 underneath covering 78. If desired, magnets 88 may be mounted by snapping them into a suitably shaped groove located as shown in FIG. 4. Magnets 88 magnetically attract metallic strip 90 to secure cover 72 in a closed position when it has been manually pivoted to that position. Optionally, however, the hook-and-loop elements 18 and 19, shown in FIG. 1, or other suitable retention means can be employed to retain cover 72 in a closed position.

Figure 5:
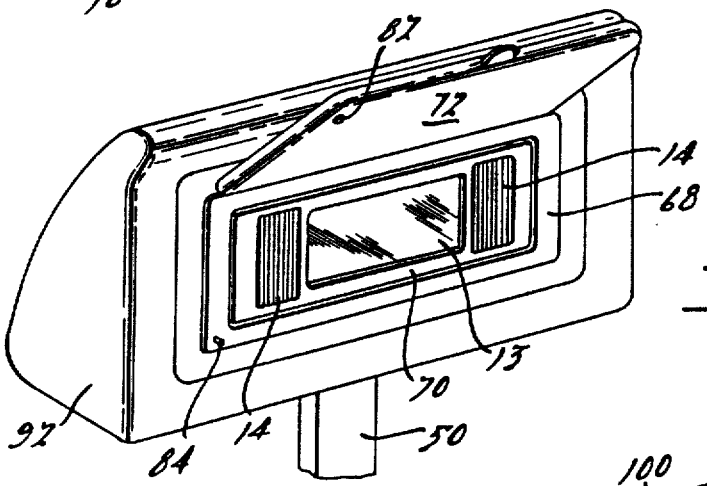
FIGS. 5 and 6 are partial perspective views of third and fourth embodiments of the present invention, respectively.

The embodiment of FIG. 5 is similar to that of FIG. 4, except that cover 72 is pivoted at its top edge, rather than at its lower edge, and the head restraint 92 is of a slightly different overall configuration.

Figure 6:
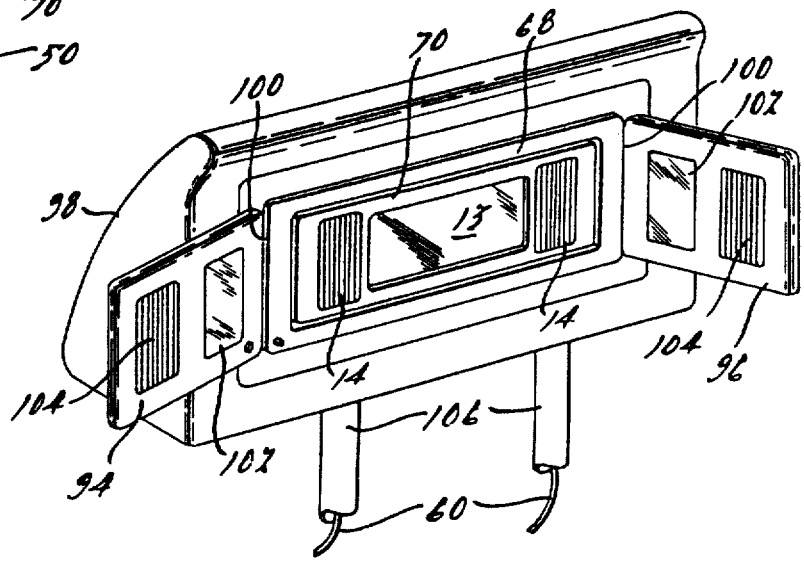

The embodiment of FIG. 6 is similar to that of FIG. 5, except that the cover is divided into two portions 94 and 96, each secured to head restraint 98 by a vertically extending integral hinge 100 disposed on the lateral sides thereof. In this particular embodiment, cover portions 94 and 96 can optionally each be provided with a mirror 102 on its interior surface. The increased number of mirrors increases the visible surface of the viewer. If desired, illumination means 104 may also be positioned on each cover portion 94 and 96. The embodiment of FIG. 6 also incorporates a dual mounting arm configuration having two generally cylindrical hollow tubular arms 106. In this configuration, power leads 60 may be positioned in the interior of each of hollow tubular arms 106. Mounting arms 106 may be secured to the head restraint reinforcement element generally in the same manner as in the embodiment of FIG. 4.

In the embodiment of FIG. 7, the mirror housing 70 is mounted by a ball and socket connection to provide for limited universal movement of the mirror and lights with respect to the seat and head restriant. The connection comprises a socket 108 affixed to mounting plate 46 and a complimentary shaped and sized ball member 110 attached to the back of mirror housing 70 and pivotally disposed in socket 108. The parts may be formed of a resilient material, such as plastic, so that they may be assembled by being merely snapped together. This embodiment is otherwise generally the same as that of FIG. 4.

In FIG. 8 there is shown, in cross-section, a representative light assembly, usually two of which are used in each mirror assembly. At the location of a light assembly, mirror housing 70 preferably comprises a removable Fresnel-type lens 112, a support bracket and reflector 114 affixed to housing 70 and overlying the inside face of lens 112, and a bulb socket and reflector member 116 affixed to bracket 114, in which a conventional bulb 118 is removably disposed. Power is supplied using conventional wiring from the vehicle battery. Alternatively, a separate battery can be located in each seat or head restraint provided with a vanity mirror of the present invention. The switch circuit is conventional.

The present vanity mirror assembly 12 may also be positioned in or on the back of a vehicle seat 150 having an integral head restraint 152, as shown in FIGS. 9 and 10. In FIG. 9 integral head restraint 152 is modified to accommodate the vanity mirror assembly 12 described herein. Alternatively, vanity mirror assembly 12 of the present invention may be positioned elsewhere on the back of vehicle seat 150, as shown in FIG. 10. Since the present invention provides for pivoting movement of the mirror and lights, the vanity mirror assembly can be positioned in a multiplicity of positions on a vehicle seat back and still function satisfactorily.

Figure 11:
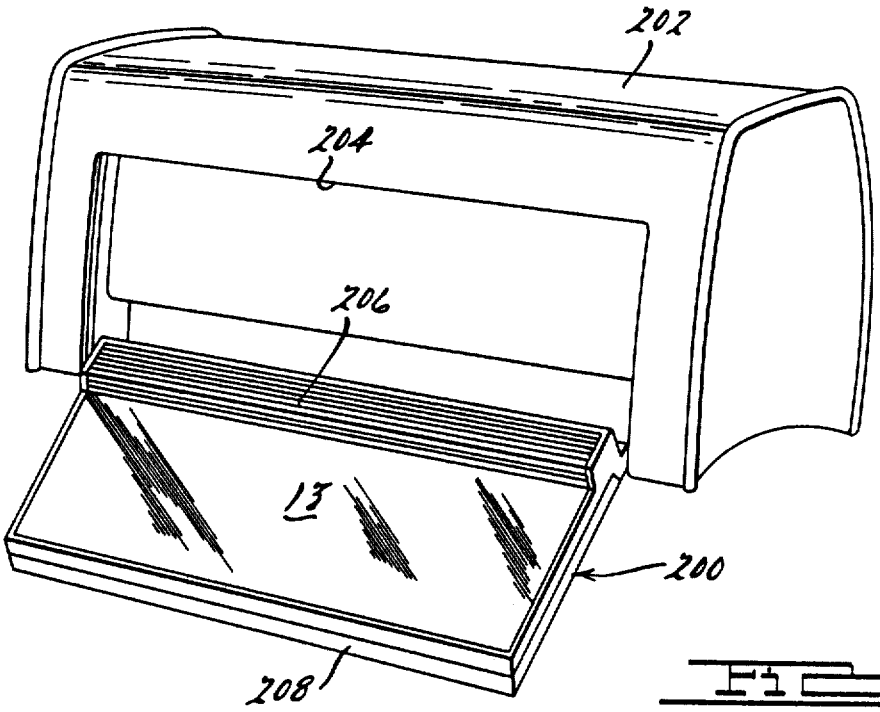

FIG. 11 illustrates another embodiment of the present invention, in which a mirror assembly 200 is pivotably mounted to a head restraint 202 having a recess 204 on its posterior side for storage of mirror assembly 200 in its closed position. Mirror assembly 200 comprises a light assembly 206, a mirror 13 and a base plate 208. The mirror and light assembly can be of any desired construction. The base plate 208 is generally rectangular in plan and is hinged along its top edge (when open) to head restraint 202, in any suitable manner. Light assembly 206 preferably projects from the plane of base plate 206, and has a rectangular lens positioned adjacent the top edge of mirror 13 when assembly 200 is open. The light assembly and mirror retract into the recess 204 of head restraint 202 when the assembly is in its closed position. Any suitable type of closing and latching means may be used to maintain the assembly in its closed position, including magnetic means, hook-and-loop fastener means, latch-and-catch means, or the like. Mirror assembly 200 is shown in an intermediate position in FIG. 11. When open, the mirror assembly hangs generally downwardly where it can be manually tilted to any desired position.

Figure 12:
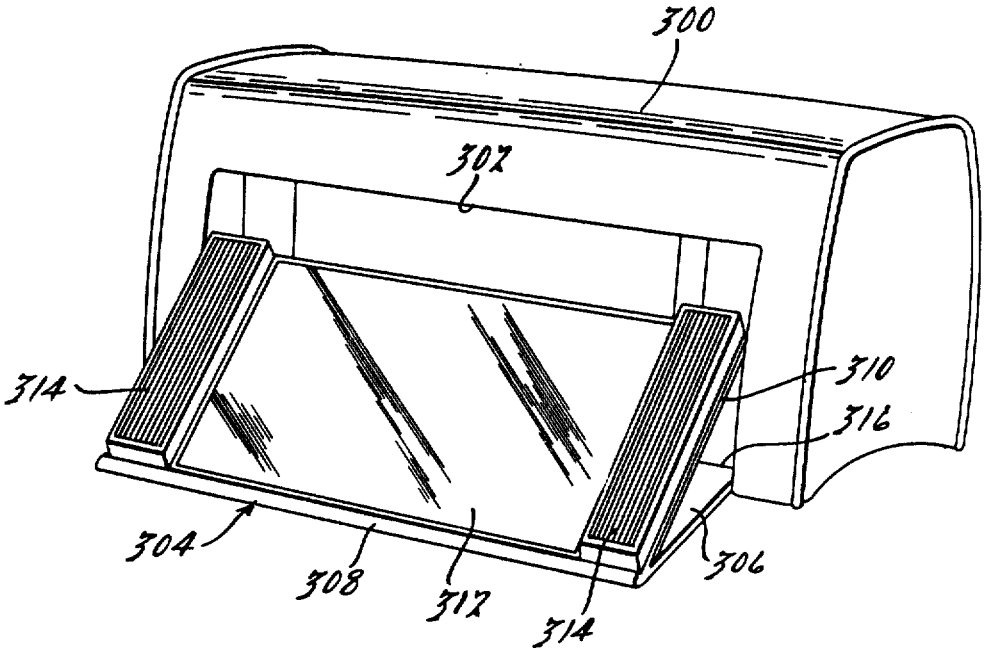

FIG. 12 illustrates another embodiment of the present invention, in which a head restraint 300 has a recess 302 on its posterior side adapted to accept a vanity mirror and light assembly 304. Assembly 304 comprises a base plate 306 hinged at 308 to a mirror support 310 on which is mounted a mirror 312 and a pair of light assemblies 314 of any desired type. Assembly 304 is pivotally connected to restraint 300 by a pivotal hinge located at 316.

Mirror 312 (and lights 314) can be manually set at any inclination by merely swinging the assembly about pivot 316, with the top edge of the assembly resting against the bottom surface of recess 302. If desired, suitable notches may be provided on either mirror support 310 or one of the surfaces of recess 302, with corresponding projections on the other part, in order to provide fixed mirror positions. To close the assembly, mirror support 310 is swung downwardly against base plate 306, and the entire assembly swung upwardly into closed position, where it can be maintained by any suitable latch or gripping arrangement.

FIGS. 13 through 19 illustrate various embodiments of seat assemblies generally similar to those shown in FIGS. 1 through 12, but having a mounting apparatus for a mirror, a mirror and light, or other vehicle accessory assembly, operably connected with, and retained, by an apparatus for mounting and interconnecting a head restraint with a vehicle seat. In FIG. 13, a head restraint 410 is mounted on the top of a vehicle front seat 411, and the vehicle seat assembly incorporates an exemplary lighted vanity mirror assembly 412 thereon. The mirror assembly 412 includes a receptable 422, in which a mirror housing 420 supports a mirror 413, one or more side lights 414, and preferably a cover 416, which are generally similar to the corresponding elements described above in connection with FIGS. 1 through 12. Because many of the elements of the embodiments in FIGS. 13 through 19 correspond either structurally or functionally to similar elements in FIGS. 1 through 12, such elements of FIGS. 13 through 19 are indicated by reference numerals 300 numerals higher than the corresponding elements of FIGS. 1 through 3.

In FIGS. 13 and 14, head restraint mounting arms 424 for mounting and supporting head restraint 410 on vehicle seat 411. Head restraint 410 can be supported in a fixed vertical position relative to seat 411, or seat 411 can optionally include appropriate receptacles 431 (shown in FIG. 14) for slidably receiving mounting arms 424 in order to allow the vertical position of head restraint 410 to be selectively adjusted or altered.

Mirror and light assembly 412 includes a mounting plate 426, which is preferably fixedly attached to, or integrally formed with, receptacle 422. Mounting plate 426 includes openings 427 for receiving mounting arms 424 extending therethrough for mounting and retaining mirror and light assembly 412 on vehicle seat 411. In such an arrangement, mounting plate 426 rests generally flatly on top of vehicle seat 411, with mirror and light assembly 412 being correspondingly disposed and supported on the rear side of vehicle seat 411 and being retained in such position by the interconnection of mounting plate 426 and head restraint mounting arms 424.

As shown in FIG. 14, mounting plate 426 preferably includes a recessed portion 428 for receiving one or more electrical power leads 423, which electrically interconnect a vehicle power source with side lights 414. Electrical power leads 423 can be received and at least partially housed within a groove or other recessed portion 433 formed in mounting arms 424 in order to allow power leads 423 to be routed through vehicle seat 411 to the mirror and light assembly 412. In one variation of the present invention wherein head restraint 410 and mounting arms 424 are vertically movable in order to allow for selective adjustment of the vertical position of head restraint 410, such grooves or recessed portions 433 can be sized and configured to slidably engage power leads 423 as head restraint 410 and mounting arms 424 are raised or lowered within receptacles 431 in vehicle seat 411. Alternatively, as discussed below, such electrical power leads 423 can be optionally housed within the typically cylindrical tubular and hollow mounting arms 424 in embodiments of the invention wherein such vertical adjustability of head restraint 410 is not required.

It should be noted that although mirror and light receptacle 422 and mounting plate 426 are illustrated in FIGS. 13 and 14 as merely resting against the rear side and top of vehicle seat 411, respectively, such components can optionally be releasably or fixedly attached to vehicle seat 411 by hook-and-loop fastener devices, or by other suitable fastening apparatus known to those skilled in the art.

FIG. 15 illustrates another exemplary embodiment of the present invention, which is generally similar to that discussed above and shown in FIGS. 13 and 14, except that the pair of preferably cylindrical and hollow mounting arms 424 are replaced by a single mounting arm 424a, which is typically rectangular in lateral cross-section. In order to provide the above-discussed retention and support of mirror and light assembly 412a, mounting plate 426a in FIG. 15 is correspondingly provided with a single, generally rectangular opening 427a. In all other respects, the exemplary arrangement depicted in FIG. 15 is substantially similar to that of FIGS. 13 and 14, and is adaptable in embodiments of the present invention wherein head restraint 410a is either fixedly supported and interconnected with vehicle seat 411a or vertically adjustable relative thereto.

FIGS. 16 and 17 illustrate still another optional, exemplary variation on the present invention for a vehicle seat assembly generally similar to those described and illustrated in connection with FIGS. 13 through 15, except that mirror and light assembly 412b is positioned and received within an opening or relieved portion 409b in head restraint 410b. In such an optional embodiment, mirror and light assembly 412b includes a mounting plate 426b, which is fixedly attached to, or integrally formed with, receptacle 422b. Mounting plate 426b, in FIGS. 16 and 17, includes outwardly-extending proportions 435b, which have openings 427b for receiving head restraint mounting arms 424b therethrough. By such an arrangement, mirror and light assembly 412b is supported and retained by the interconnection between the mounting plate 426b and the mounting arms 424b in a generally upwardly-extending position relative to the top of vehicle seat 411b when installed thereon. If deemed necessary or desirable in a particular installation, mounting plate 426b can be attached to the bottom of head restraint 410b by a fastener 429, as shown in FIG. 17, or by other suitable fastening apparatus known to those skilled in the art.

Because mounting plate 426b supports mirror and light assembly 412b in the above-described position extending upwardly into the opening or relieved portion 409b of head restraint 410b, one or more power leads 423b can be routed through the typically cylindrical and hollow mounting arms 424b and through the recessed portion 428b in mounting plate 426b for providing electrical interconnection of side lights 414b with a vehicle power source. Such an arrangement can be employed in the embodiment shown in FIGS. 16 and 17, regardless of whether head restraint 410b and mounting arms 424b are fixed relative to vehicle seat 411b or vertically movable in order to provide for selective adjustment of the vertical position of head restraint 410b. Alternately, mirror and light assembly 412b, as well as any of the other mirror, light or other assemblies discussed herein and shown in the drawings, can optionally be provided with a replaceable electrical battery or other internal power source in order to avoid the necessity for routing electrical power leads through the vehicle seat.

FIGS. 18 and 19 depict further exemplary embodiments of the present invention for purposes merely illustrating the wide variety of applications in which the principles of the present invention can advantageously be employed. In FIG. 18, for example, an accessory assembly 412c is generally similar to the exemplary mirror and light assemblies 412 through 412b discussed above in connection with FIGS. 13 through 17, except that the mirror and lights are replaced by a television or video monitor and receiving device 435c. Video device 435c can be provided for the convenience and entertainment of rear seat passengers and can optionally be accompanied by a video game apparatus 437c, or other such accessories. Video device 435c, and optional game apparatus 437c, are selectively operable by way of suitable controls 439c and are installed in accessory assembly 412c, which is retained and supported on the rear side of seat 411c by a connection between mounting plate 426c and mounting arms 424c in an arrangement similar to that discussed above and shown in FIGS. 13 through 15.

FIG. 19 depicts an exemplary rear seat vehicle accessory assembly 412d, which is generally similar to accessory assembly 412c, described above, and is mounted in a similar manner on vehicle seat 411d by a mounting plate 426d connected to mounting arms 424d. Rather than the video monitor and game equipment shown for purposes of illustration in FIG. 18, however, exemplary accessory assembly 412d includes audio apparatus 441d, which in turn can optionally include such equipment as audio speakers 443d, a cassette, a compact disc player, or other audio equipment indicated diagrammatically by reference numeral 445d, and stereo AM/FM receiver 447d, for example. Like the video equipment discussed above, the audio equipment shown for purposes of illustration in FIG. 19 can be provided for the convenience and entertainment of rear seat vehicle passengers and accordingly includes appropriate controls indicated generally by reference numeral 439d.

From the foregoing discussion, and the illustrations shown in FIGS. 13 through 19, one skilled in the art will now readily recognize that the mounting arrangements shown in FIGS. 13 through 19 can be employed for mounting any of a number of accessory assemblies on a vehicle seat assembly, in either a generally downwardly-depending position as shown in FIGS. 13 through 15, 18 and 19, or in a generally upwardly-extending disposition as shown in FIGS. 16 and 17.

Although it is not shown specifically in the drawings, one skilled in the art will now recognize that any of the mounting plates shown in FIGS. 13 through 19 for mirror, light, or other vehicle accessory assemblies can optionally be provided with narrow openings or slots communicating the respective openings 427 through 427d with a peripheral edge of the respective mounting plates in order to allow the respective mounting plates to be snapped onto the respective head restraint mounting arms, or otherwise retained thereon, without removing the head restraint from the vehicle seat. Such an arrangement can be advantageously provided for aftermarket or dealer-installed mirror, light, or other accessory assemblies, for example. It should further be noted that many of the various features and optional components shown in FIGS. 1 through 12, and discussed above, can also be incorporated in the embodiments of the present invention illustrated in FIGS. 13 through 19. Likewise, the various mounting arrangements illustrated in FIGS. 13 through 19 can also be incorporated in the appropriate embodiments illustrated in FIGS. 1 through 12.

The mounting arrangements for the mirror, light, and other accessory assemblies discussed above provide for a relatively simple and convenient installation of such assemblies on the rear side of front vehicle seats, either as standard vehicle equipment or as optional equipment, with little or no changes or modifications being required in the vehicle seat assemblies. Furthermore, servicing or replacement of such assemblies can be conveniently and easily accomplished by merely removing the associated head restraints and head restraint mounting arms in order to release the assemblies from their associated vehicle seats.

The foregoing discussion discloses and describes exemplary embodiments of the present invention. One skilled in the art will readily recognize from such discussion, and from the accompanying drawings, that various changes, modifications and variations may be made therein without departing from the spirit and scope of the invention as defined in the following claims.

What is claimed is:

1. In a seat assembly for a vehicle, including a seat having front and rear sides, a head restraint, and head restraint mounting means for interconnecting said head restraint with said seat, the improvement comprising: a mirror housing including a mirror; and a mirror housing mounting means coupled with said mirror housing for mounting said mirror housing on the rear of said seat assembly, said mirror housing mounting means including means for coupling with, and being retained by, the head restraint mounting means in order to retain and support said mirror housing on the rear side of the seat the head restraint mounting means including at least one mounting arm supportingly interconnecting the head restraint with the seat, said mirror housing mounting means including at least one opening extending therethrough for receiving said mounting arm extending therethrough in order to connect said mirror housing with said mounting arm and to retain said mirror housing on the seat assembly.

2. The improvement according to claim 1, wherein said mirror housing mounting means is connected with, and retained by, the head restraint mounting means at a position generally between the seat and the head restraint.

3. The improvement according to claim 2, wherein said mirror housing means and the head restraint mounting means support said mirror housing in a generally downwardly-suspended disposition relative to the top of the seat when said mirror housing is mounted thereon, said mirror housing mounting means being the sole means for retaining said mirror housing to the seat assembly.

4. The improvement according to claim 2, wherein said mirror housing mounting means and the head restraint mounting means support said mirror housing in a generally upwardly-extending disposition relative to the top of the seat when said mirror housing is installed thereon.

5. The improvement according to claim 1, wherein said mirror housing mounting means includes a plate member having said opening extending therethrough, said plate member being fixed to said mirror housing.

6. The improvement according to claim 5, wherein said mirror housing includes a mirror receptacle means for receiving and supporting said mirror thereon, said plate member being integrally formed with said mirror receptacle means.

7. The improvement according to claim 5, wherein the head restraint mounting means includes a number of said mounting arms, and said plate member includes a corresponding number of said openings extending therethrough.

8. The improvement according to claim 1, wherein the head restraint and said mounting arm are movable with respect to the seat in order to selectively adjust the vertical position of the head restraint relative to the seat assembly, said mounting arm being slidably received in said opening in said portion of said mirror housing mounting means for movement of the head restraint and said mounting arm relative thereto.

9. The improvement according to claim 8, wherein said opening in said mirror housing mounting means is disposed generally between the seat and the head restraint, said mirror housing mounting means and the head restraint mounting means supporting said mirror housing in a generally downwardly-suspended position relative to the top of the seat when said mirror housing is mounted thereon, said mirror housing mounting means being the sole means for retaining said mirror housing to the seat assembly.

10. The improvement according to claim 8, wherein said mirror housing mounting means includes a plate member having said opening extending therethrough, said plate member being fixed to said mirror housing.

11. The improvement according to claim 10, wherein the head restraint is movable with respect to the seat in order to selectively adjust the vertical position of the head restraint relative to the seat assembly, said mirror housing being retained for movement with the head restraint with respect to the seat.

12. The improvement according to claim 1, wherein said opening in said mirror housing mounting means is disposed generally between the seat and the head restraint, said mirror housing mounting means and the head restraint mounting means supporting said mirror housing in a generally upwardly-extending disposition relative to the top of the seat when said mirror housing is installed thereon.

13. In a seat assembly for a vehicle, including a seat having front and rear sides, a head restraint, and head restraint mounting means for interconnecting said head restraint with said seat, the improvement comprising: a light housing including a light; and a light housing mounting means coupled with said light housing for mounting said light housing on the rear of said seat assembly, said light housing mounting means including means for coupling with, and being retained by, the head restraint mounting means in order to retain and support said light housing on the rear side of the seat, the head restraint mounting means includes at least one mounting arm supportingly interconnecting the head restraint with the seat, said light housing mounting means including at least one opening extending therethrough for receiving said mounting arm extending therethrough in order to connect said light housing with said mounting arm and to retain said light housing on the seat assembly.

14. The improvement according to claim 13, wherein said light housing mounting means is connected with, and retained by, the head restraint mounting means at a position generally between the seat and the head restraint.

15. The improvement according to claim 14, wherein said light mounting means and the head restraint mounting means support said light housing in a generally downwardly-suspended disposition relative to the top of the seat when said light housing is mounted thereon, said light housing mounting means being the sole means for retaining said light housing to the seat assembly.

16. The improvement according to claim 14, wherein said light housing mounting means and the head restraint mounting means support said light housing in a generally upwardly-extending disposition relative to the top of the seat when said light housing is installed thereon.

17. The improvement according to claim 13, wherein said light housing mounting means includes a plate member having said opening extending therethrough, said plate member being fixed to said light housing.

18. The improvement according to claim 17, wherein said light housing includes a light receptacle means for receiving and supporting said light thereon, said plate member being integrally formed with said light receptacle means.

19. The improvement according to claim 17, wherein the head restraint mounting means includes a number of said mounting arms, and said plate member includes a corresponding number of said openings extending therethrough.

20. The improvement according to claim 13, wherein the head restraint and said mounting arm are movable with respect to the seat in order to selectively adjust the vertical position of the head restraint relative to the seat assembly, said mounting arm being slidably received in said opening in said portion of said light housing mounting means for movement of the head restraint and said mounting arm relative thereto.

21. The improvement according to claim 20, wherein said opening in said light housing mounting means is disposed generally between the seat and the head restraint, said light housing mounting means supporting said light housing in a generally downwardly-suspended position relative to the top of the seat when said light housing is mounted thereon, said light housing mounting means being the sole means for retaining said light housing to the seat assembly.

22. The improvement according to claim 20, wherein said opening in said light housing mounting means is disposed generally between the seat and the head restraint, said light housing mounting means and the head restraint mounting means supporting said light housing in a generally upwardly-extending disposition relative to the top of the seat when said light housing is installed thereon.

23. The improvement according to claim 20, wherein said light housing mounting means includes a plate member having said opening extending therethrough, said plate member being fixed to said light housing.

24. The improvement according to claim 23, wherein the head restraint is movable with respect to the seat in order to selectively adjust the vertical position of the head restraint relative to the seat assembly, said light housing being retained for movement with the head restraint with respect to the seat.

25. The improvement according to claim 13, wherein the vehicle includes a power source, said seat assembly further comprising power lead means for operably interconnecting said light with said power source, at least a portion of said power lead means extending generally along the head restraint mounting means, the head restraint mounting means including means for at least partially housing said power lead means.

26. The improvement according to claim 25, wherein said light housing mounting means includes a recessed portion for receiving said power lead means therein.

27. In a seat assembly for a vehicle, including a seat having front and rear sides, a head restraint, and head restraint mounting means for interconnecting said head restraint with said seat, the improvement comprising: a mirror and light housing, including a mirror and a light; and a mirror and light mounting means coupled with said mirror and light housing for mounting said mirror and light housing on the rear of the seat assembly, said mirror and light housing mounting means including means for coupling with, and being retained by, the head restraint mounting means at a position generally between the seat and the head restraint in order to retain and support said mirror and light housing on the rear side of the seat, the head restraint mounting means including at least one mounting arm supportingly interconnecting the head restraint with the seat, said mirror said light housing mounting means including at least one plate member fixed to said mirror and light housing and having at least one opening extending therethrough for receiving said mounting arm extending therethrough in order to connect said mirror and light housing with said mounting arm and to retain said mirror and light housing on the seat assembly.

28. The improvement according to claim 27, wherein the vehicle includes a power source, said seat assembly further comprising power lead means for operably interconnecting said light with said power source, at least a portion of said power lead means extending generally along the head restraint mounting means, the head restraint mounting means including means for at least partially housing said power lead means.

29. The improvement according to claim 28, wherein said mirror and light housing mounting means includes means for receiving and at least partially housing said power lead means therein.

30. The improvement according to claim 27, wherein said mirror and light housing includes a mirror and light receptacle means for receiving and supporting said mirror and said light thereon, said plate member being integrally formed with said mirror and light receptacle means.

31. The improvement according to claim 27, wherein the head restraint and said mounting arm are movable with respect to the seat in order to selectively adjust the vertical position of the head restraint relative to the seat assembly, said mounting arm being slidably received in said opening in said plate member for movement of the head restraint and said mounting arm relative thereto.

32. The improvement according to claim 31, wherein said mirror and light housing is supported by said plate and said mounting arm in a generally downwardly-suspended disposition relative to the top of the seat when said mirror and light housing is mounted thereon.

33. The improvement according to claim 31, wherein said mirror and light housing is supported by said plate and said mounting arm in a generally upwardly-extending disposition relative to the top of the seat when said mirror and light housing is mounted thereon.

34. The improvement according to claim 27, wherein said mirror and light housing is supported by said plate and said mounting arm in a generally upwardly-extending disposition relative to the top of the seat when the mirror and light housing is mounted on the seat assembly, the head restraint including an open portion therein for receiving said mirror and light housing extending thereinto.

35. The improvement according to claim 34, wherein said head restraint and said mirror and light housing are movable together with respect to the seat.

36. The improvement according to claim 27, wherein said mirror and light housing further includes a cover for said mirror and light, said mirror and said light being pivotally connected to said mirror and light housing for pivotal movement relative thereto about a first axis, said cover being pivotally interconnected to said mirror and light housing for pivotal movement relative thereto about a second axis between a first closed position substantially covering said mirror and light and a second position wherein said mirror and light are not covered.

37. The improvement according to claim 36, wherein said first and second axes are both generally horizontal.

38. The improvement according to claim 36, further comprising a universal connection for pivotally connecting said mirror and said light with said mirror and light housing for generally universal pivotal movement with respect thereto.

39. The improvement according to claim 36, wherein said mirror and light are interconnected to one another for pivotal movement together with respect to said mirror and light housing.

40. In a seat assembly for a vehicle, including a seat having front and rear sides, a head restraint, and head restraint mounting means for interconnecting said head restraint with said seat, the improvement comprising: a vehicle accessory housing including a vehicle accessory; and an accessory housing mounting means coupled with said accessory housing for mounting said accessory housing on the seat assembly, said accessory housing mounting means including means for coupling with, and being retained by, the head restraint mounting means in order to retain and support said accessory housing on one of the sides of the seat, the head restraint mounting means including at least one mounting arm supportingly interconnecting the head restraint with the seat, said vehicle accessory housing mounting means including at least one plate member fixed to said vehicle accessory housing and having at least one opening extending therethrough for receiving said mounting arm extending therethrough in order to connect said vehicle accessory housing with said mounting arm and to retain said vehicle accessory housing on the seat assembly.

41. The improvement according to claim 40, wherein said accessory housing mounting means is connected with, and retained by, the head restraint mounting means at a position generally between the seat and the head restraint.

42. The improvement according to claim 41, wherein said accessory housing mounting means and the head restraint mounting means support said accessory housing in a generally downwardly-suspended disposition relative to the top of the seat when said accessory housing is mounted thereon, said accessory housing mounting means being the sole means for retaining said accessory housing to the seat assembly.

43. The improvement according to claim 41, wherein said accessory housing mounting means and the head restraint mounting means support said accessory housing in a generally upwardly-extending disposition relative to the top of the seat when said accessory housing is installed thereon.

44. The improvement according to claim 40, wherein the vehicle includes a power source, said seat assembly further comprising power lead means for operably interconnecting said accessory with said power source, at least a portion of said power lead means extending generally along the head restraint mounting means, the head restraint mounting means including means for at least partially housing said power lead means.

*45. In a seat assembly for a vehicle, including a seat having front and rear sides, a head restraint, and head restraint mounting means for interconnecting said head restraint with said seat, the improvement comprising: a video accessory housing including a video accessory; and a video accessory housing mounting means coupled with said video accessory housing for mounting said video accessory housing on the seat assembly, said video accessory housing mounting means including means for coupling with, and being retained by, the head restraint mounting means in order to retain and support said video accessory housing on one of the sides of the seat, the head restraint mounting means including at least one mounting arm supportingly interconnecting the head restraint with the seat, said video accessory housing mounting means including at least one plate member fixed to said video accessory housing and having at least one opening extending therethrough for receiving said mounting arm extending therethrough in order to connect said video accessory housing with said mounting arm and to retain said video accessory housing on the seat assembly.*

*46. The improvement according to claim 45, wherein said video accessory housing mounting means is connected with, and retained by, the head restraint mounting means at a position generally between the seat and the head restraint.*

*47. The improvement according to claim 46, wherein said video accessory housing mounting means and the head restraint mounting means support said video accessory housing in a generally downwardly-suspended disposition relative to the top of the seat when said video accessory housing is mounted thereon, said video accessory housing mounting means being the sole means for retaining said video accessory housing to the seat assembly.*

*48. The improvement according to claim 46, wherein said video accessory housing mounting means and the head restraint mounting means support said video accessory housing in a generally upwardly-extending disposition relative to the top of the seat when said video accessory housing is installed thereon.*

*49. The improvement according to claim 48, wherein the vehicle includes a power source, said seat assembly further comprising power lead means for operably interconnecting said video accessory with said power source, at least a portion of said power lead means extending generally along the head restraint mounting means, the head restraint mounting means including means for at least partially housing said power lead means.*

*50. The improvement according to claim 45, wherein said video accessory includes a video receiver device.*

*51. The improvement according to claim 45, wherein said video accessory includes a video game device.*

*52. In a seat assembly for a vehicle, including a seat having front and rear sides, a head restraint, and head restraint mounting means for interconnecting said head restraint with said seat, the improvement comprising: an audio accessory housing including an audio accessory; and an audio accessory housing mounting means coupled with said audio accessory housing for mounting said audio accessory housing on the seat assembly, said audio accessory housing mounting means including means for coupling with, and being retained by, the head restraint mounting means in order to retain and support said audio accessory housing on one of the sides of the seat, the head restraint mounting means including at least one mounting arm supportingly interconnecting the head restraint with the seat, said audio accessory housing mounting means including at least one plate member fixed to said audio accessory housing and having at least one opening extending therethrough for receiving said mounting arm extending therethrough in order to connect said audio accessory housing with said mounting arm and to retain said audio accessory housing on the seat assembly.*

*53. The improvement according to claim 52, wherein said audio accessory housing mounting means is connected with, and retained by, the head restraint mounting means at a position generally between the seat and the head restraint.*

*54. The improvement according to claim 53, wherein said audio accessory housing mounting means and the head restraint mounting means support said audio accessory housing in a generally downwardly-suspended disposition relative to the top of the seat when said audio accessory housing is mounted thereon, said audio accessory housing mounting means being the sole means for retaining said audio accessory housing to the seat assembly.*

*55. The improvement according to claim 53, wherein said audio accessory housing mounting means and the head restraint mounting means support said audio accessory housing in a generally upwardly-extending disposition relative to the top of the seat when said audio accessory housing is installed thereon.*

*56. The improvement according to claim 55, wherein the vehicle includes a power source, said seat assembly further comprising power lead means for operably interconnecting said audio accessory with said power source, at least a portion of said power lead means extending generally along the head restraint mounting means, the head restraint mounting means including means for at least partially housing said power lead means.*

*57. The improvement according to claim 52, wherein said audio accessory includes an audio radio receiving device.*

*58. The improvement according to claim 52, wherein said audio accessory includes an audio tape cassette player.*

*59. The improvement according to claim 52, wherein said audio accessory includes a compact disc player.*

* * * * *